United States Patent
Oda (10) Patent No.: US 7,864,370 B2
(45) Date of Patent: Jan. 4, 2011

(54) COPY MACHINE WITH IMAGE ROTATION AND BACK SURFACE READING BASED ON MEMORY CAPACITY REQUIRED

(75) Inventor: Akihiko Oda, Hino (JP)

(73) Assignee: Konica Minolta Business Technologies, Inc., Tokyo (JP)

(*) Notice: Subject to any disclaimer, the term of this patent is extended or adjusted under 35 U.S.C. 154(b) by 535 days.

(21) Appl. No.: 12/015,128

(22) Filed: Jan. 16, 2008

(65) Prior Publication Data

US 2008/0174837 A1    Jul. 24, 2008

(30) Foreign Application Priority Data

Jan. 22, 2007  (JP) .............................. 2007-011170

(51) Int. Cl.
*G06K 15/00* (2006.01)
*H04N 1/387* (2006.01)
*H04N 1/21* (2006.01)
*G06T 3/60* (2006.01)
*H04N 1/04* (2006.01)

(52) U.S. Cl. ..................... 358/1.9; 358/1.16; 358/404; 358/474; 358/498; 382/296

(58) Field of Classification Search .................. 358/1.9, 358/1.16, 1.17, 1.18, 524, 404, 444, 474, 358/488, 498; 382/286, 289, 296, 207, 305
See application file for complete search history.

(56) References Cited

U.S. PATENT DOCUMENTS

| | | | | |
|---|---|---|---|---|
| 2007/0153339 A1* | 7/2007 | Itoh | ........................... | 358/498 |
| 2008/0259413 A1* | 10/2008 | Sakurai | ...................... | 358/497 |
| 2009/0059265 A1* | 3/2009 | Kitahara | ..................... | 358/1.13 |
| 2009/0059312 A1* | 3/2009 | Kitahara | ..................... | 358/448 |

FOREIGN PATENT DOCUMENTS

JP          7-193680          7/1995

* cited by examiner

*Primary Examiner*—Scott A Rogers
(74) *Attorney, Agent, or Firm*—Finnegan, Henderson, Farabow, Garrett & Dunner, L.L.P.

(57) ABSTRACT

A copy machine including: an original reading apparatus having a front and back surface image reading sensors, being capable of setting plural original documents, feeding out one by one, and simultaneously reading both surfaces of the documents; an image forming apparatus; a post processing apparatus for stapling and/or punching; an image processing section which rotates an image; wherein, a control section controls such that: when the memory capacity for image rotation is enough, the documents are read by the front surface image reading sensor; the obtained image data is rotated; and an image is formed on the recording sheet based on the rotated image data; whereas, when the memory capacity is not enough, an indication to re-set the documents is displayed; the re-set documents are fed out to be read by the back surface image reading sensor; an image is formed based on the image data obtained; and the post processing is executed.

6 Claims, 8 Drawing Sheets

COPY MACHINE WITH IMAGE ROTATION AND BACK SURFACE READING BASED ON MEMORY CAPACITY REQUIRED

CROSS REFERENCE TO RELATED APPLICATION

The present application is based on Japanese Patent Application No. 2007-011170 filed with Japanese Patent Office on Jan. 22, 2007, the entire content of which is hereby incorporated by reference.

BACKGROUND OF THE INVENTION

1. Field of the Invention

The present invention relates to a copy machine provided with an original reading apparatus and at least one of the post processing functions of stapling and punching, wherein an image is formed on a recording sheet based on the image data obtained by reading an original.

2. Description of the Related Art

The copy machine employed over a wide range in an office and others includes a digital image forming apparatus for forming an image based on the image data obtained by reading original, and a post processing apparatus for stapling and punching.

Such a copy machine has an original reading apparatus that reads images on multiple numbers of originals sequentially page by page, and generates image data. The user sets an original on the original reading apparatus, sets the number of copies, stapling and punching operations and presses the Start button, whereby the set number of prints are stapled or punched, and are outputted.

In the meantime, in the duplex copying, original reading is applied sequentially to the back surface image after the front surface image. Similarly, the front surface image and back surface image formation are executed sequentially.

In such duplex copying procedure, both the original reading and image formation are performed sequentially for the front and back surface images, and this requires much time. To solve this problem, there is an active demand for a copy machine capable of simultaneously reading and printing both the front and back surface images.

An image forming apparatus capable of simultaneously printing both the front and back surface images has not yet come into widespread use because of a large size and high cost. An original reading apparatus capable of simultaneously reading the front and back surface images has been proposed and is coming into commercial use, as disclosed in the Unexamined Japanese Patent Application Publication No. 7-193680 (hereinafter referred as JPA7-193680), because a small-size and low cost version can be implemented.

Figure 1:
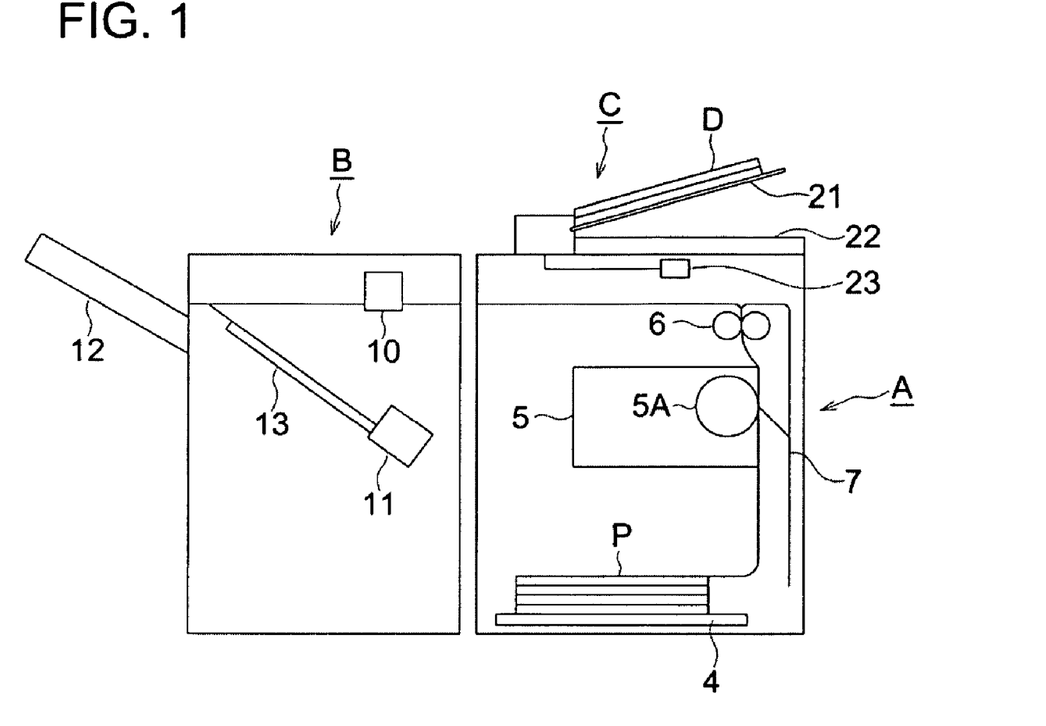

Referring to FIG. 1, the following describes the copy machine as an embodiment of the present invention and the problems to be solved by the present invention.

The copy machine of FIG. 1 includes an image forming apparatus A, post processing apparatus B and sheet-through type original reading apparatus C.

The original documents D are placed on an original feed tray 21, and are fed sheet by sheet. Passing through the conveyance path, they are ejected onto the original ejection tray 22. In the conveyance path, a line image sensor 23 sequentially reads the images on the original document D from the leading end, and forms image data.

The recording sheets P are accommodated in the sheet feed tray 4, and are fed one by one from the sheet feed tray 4 to reach the image forming section 5. In the image forming section 5, an image is formed on the recording sheet P, and the formed image is fixed on the recording sheet P by the fixing apparatus 6.

In the punch mode, the recording sheets P ejected from the image forming apparatus A are punched by the puncher 10 of the post processing apparatus B and are then ejected into the ejection tray 12.

In the staple mode, the recording sheets P are stacked on the stacker 13, and the right ends of the recording sheets P are stapled by a stapler 11 installed on the right end of the stacker 13.

Figure 2:
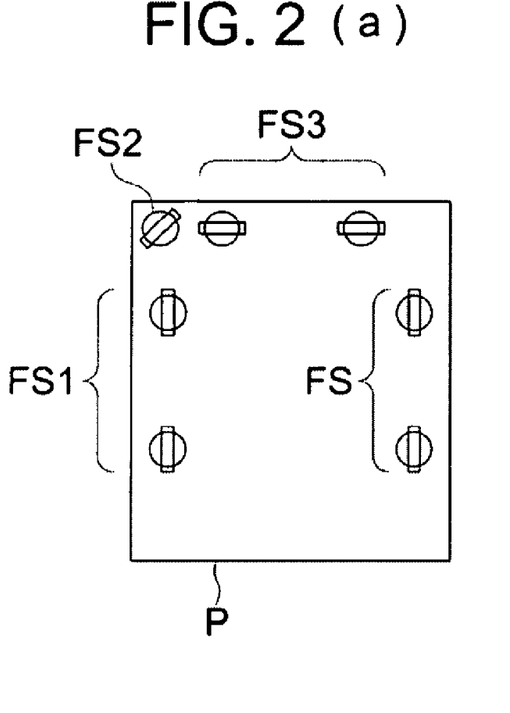

Referring to FIG. 2, the following describes the positional relationship between the recording sheet and image in the copying process wherein originals are read and copied, and stapling or punching operation is performed.

As shown in FIG. 2 (a), stapling or punching may be applied to the right, left and top ends of the recording sheets P. Stapling or punching will be explained in terms of post processing It is a common practice that post processing FS1 is applied to the left end of the page, and post processing FS2 is applied to the left end top. The post processing FS3 to be applied to the top end in the case of vertical binding is not used frequently, and the post processing FS4 to be applied to the right end is rarely used.

The following describes the post processing FS1 and FS2 in FIG. 2 (a)

The original document D of FIG. 2 (b), namely, the original document D carrying the image F is read out, and an image F is formed on the recording sheets P in an inverted form as shown in FIG. 2 (c). In FIG. 2 (c), the image F is indicated by a dotted line. This means that the image is formed on the back surface of the recording sheets P.

In the staple mode, the recording sheets P are ejected from the image forming apparatus A in the down-face state wherein the image is carried on the lower surface. Then the recording sheets P are fed to the post processing apparatus B and are stacked on the stacker 13. When the recording sheets P in the set number have been stacked, the right end as the back end is stapled by the stapler 11, as shown in the post processing FSA, whereby the bundle of recording sheets P is bound.

In the punch mode, the back end of the paper is punched in the process of the recording sheets P being fed horizontally to the post processing apparatus B.

The recording sheets P having been finish-processed are stacked onto the ejection tray 12 of the post processing apparatus B face down wherein the image carrying surface faces downward.

Such post processing is inadequate because it is intended to bind the end of line in the horizontally written original.

The adequate position of post processing is indicated by the FSB of FIG. 2 (d).

Comparison between FIG. 2 (c) and FIG. 2 (d) shows that the image of FIG. 2 (d) is 180 degrees rotated with reference to that of FIG. 2 (c).

According to the conventional method, the image is rotated 180 degrees by image processing or image data processing, and the image is formed on the recording sheet P, as shown in FIG. 2 (d). Image processing wherein the image is rotated 180 degrees is called image rotation.

In the down-face state of FIG. 2 (d), the recording sheets P stacked on the ejection tray 12 are assumed as having been bound or punched at an adequate position.

Image rotation requires a large memory capacity (e.g., 8 Mbytes for A3-sized paper).

In usual copying operation, the memory is initialized at the time of image formation, and this does not cause insufficiency in the memory capacity for image rotation. In the reservation-based copying operation wherein the image data obtained by reading is stored in the memory and the image data is sequentially read out at the time of printing, whereby the image is formed, or in the copying operation to be performed simultaneously with facsimile reception, the memory is used up for other jobs, with the result that the memory capacity may be insufficient and image rotation may fail to be performed.

Thus, the user will have to wait until the termination of the reserved job, or will be forced to take a copy without performing the desired post processing.

The suspension of work due to insufficient memory capacity will be described with reference to FIG. 3.

Figure 3:
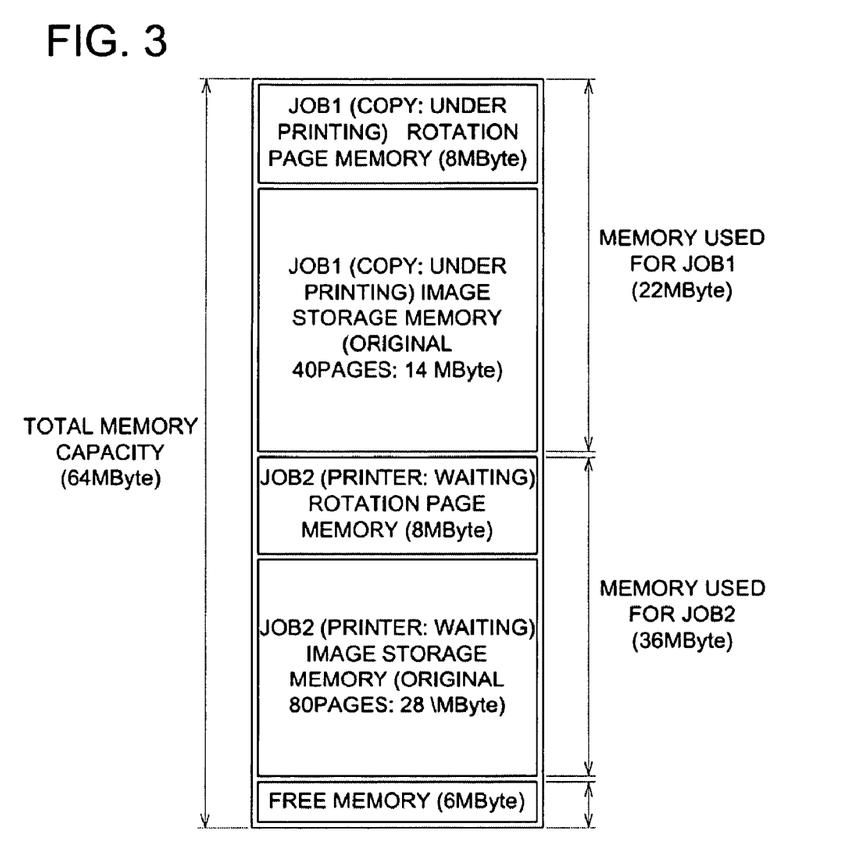
FIG. 3 is a diagram showing how the image memory is used in the reserved job.

FIG. 3 shows how the image memory is used in the reserved job, wherein the image memory capacity is assumed as 64 Mbytes.

Assume the copying job 1 wherein stapling of forty originals is designated, and the copying job 2 wherein stapling of eighty originals is designated during the execution of the job 1.

In the job 1, 8 Mbytes for image rotation and 14 Mbytes for 40 images are occupied. In the job 2, 8 Mbytes for image rotation and 28 Mbytes for 80 images are occupied This results in 8+14+8+28=58 Mbytes being occupied for jobs 1 and 2. Thus, the free capacity is 6 Mbytes. If a job following the jobs 1 and 2 involves image rotation, reservation of this job will be disabled and the user has to wait for the termination of the jobs 1 and 2.

To avoid such a problem, the memory capacity should be increased, but this will require a cost increase, and is not to be recommended.

The present invention is intended to solve the problem resulting from the aforementioned insufficiency of memory capacity, using the duplex simultaneous reading function of the original reading apparatus disclosed in the JPA7-193680.

SUMMARY

The copy machine reflecting one aspect of the present invention for achieving the aforementioned object includes:

an original reading apparatus which comprises a front surface image reading sensor and back surface image reading sensor, the original reading apparatus being capable of setting plural original documents, feeding out the original documents one by one, and simultaneously reading both surfaces of each of the original documents;

an image forming apparatus for forming an image on a recording sheet based on image data obtained by the original reading apparatus;

a post processing apparatus for executing post processing of at least one of stapling and punching onto the recording sheet on which the image is formed;

a display section;

a control section;

an image processing section which rotates an image by 180 degrees with respect to the image data;

an image memory;

wherein, in a copying operation with the post processing being designated, the control section controls in such a way that:

in cases where the memory capacity required for image rotation is available in the image memory, the original documents are read to obtain image data by the front surface image reading sensor; the obtained image data is subjected to the image rotation by the image processing section; and an image is formed on the recording sheet by the image forming apparatus based on image data having been subjected to the image rotation; whereas, in cases where the memory capacity required for the image rotation is not available in the image memory, an indication to re-set the original documents is displayed on the display section; the original documents having been re-set are fed out to be read by the back surface image reading sensor; an image is formed on the recording sheet by the image forming apparatus based on image data obtained by the back surface image reading sensor; and the post processing is executed onto the image-formed recording sheet, by the post processing apparatus.

A copy machine reflecting another aspect of the present invention includes:

an original reading apparatus which comprises a front surface image reading sensor, back surface image reading sensor, and a reversing conveyance section to reverse and convey original documents, the original reading apparatus being capable of setting plural original documents, feeding out the original documents one by one, and simultaneously reading both surfaces of each of the original documents;

an image forming apparatus for forming an image on a recording sheet based on image data obtained by the original reading apparatus;

a post processing apparatus for executing post processing of at least one of stapling and punching onto the recording sheet on which the image is formed;

a display section;

a control section;

an image processing section which rotates an image by 180 degrees with respect to the image data; an image memory;

wherein, in a copying operation with the post processing being designated, the control section controls in such a way that:

in cases where the memory capacity required for image rotation is available in the image memory, the original documents are read to obtain image data by the front surface image reading sensor; the obtained image data is subjected to the image rotation by the image processing section; and an image is formed on the recording sheet by the image forming apparatus based on image data having been subjected to the image rotation; whereas, in cases where the memory capacity required for the image rotation is not available in the image memory, the original documents set in a face-up state are fed one by one, and reversed by the reversing conveyance section; the reversed original documents are read by the back surface image reading sensor; and an image is formed on the recording sheet by the image forming apparatus based on image data obtained by the back surface image reading sensor; and the post processing is executed onto the image-formed recording sheet, by the post processing apparatus.

BRIEF DESCRIPTION OF THE DRAWINGS

FIG. 1 is a drawing representing the overall structure as an embodiment of the present invention FIGS. 2(*a*)-2(*d*) are drawings representing the positional relationship between the recording sheet and an image in a copying process of reading and copying an original and applying the processing of stapling or punching;

DETAILED DESCRIPTION OF THE PREFERRED EMBODIMENTS

The following describes the present invention with reference to the following embodiments, without the present invention being restricted thereto.

FIG. 1 shows the copy machine as an embodiment of the present invention. This copy machine includes an image forming apparatus A, post processing apparatus B and original reading apparatus C.

Original documents D are placed on the original feed tray 21, and are fed one by one to be ejected into the original ejection tray 22. The original documents D are read sequentially from the leading end in the conveyance path by the line image sensor 23 as a front surface image reading sensor. Then the image data is created.

The recording sheets P are accommodated in the sheet feed tray 4, and are fed one by one from the sheet feed tray 4. An image is transferred to the recording sheet from the photoreceptor 5A by the image forming section 5 according to the electrophotographic process, and the image is fixed by the fixing apparatus 6.

In the formation of a duplex image, a front surface image is formed by the image forming section 5 on the recording sheet P fed from the sheet feed tray 4. After the image is fixed, the recording sheets P are again fed to the sheet feed section 7 and are reversed. After that, they are fed again to the image forming section 5. The recording sheets P with the back surface image formed thereon by the image forming section 5 are subjected to the process of fixing by the fixing apparatus 6, and are conveyed to the post processing apparatus B. Then the sheets are ejected into the ejection tray 12.

In the job wherein a process of stapling is set, an image is formed on the lower surface, and the recording sheets P ejected face down from the image forming apparatus A are stacked on the stacker 13. After that, the trailing ends of the recording sheets P (right ends in the drawing) are stapled by the stapler 11. The stapled recording sheets P are conveyed in a left slanting direction over the stacker 13, and are ejected to the ejection tray 12.

In the job wherein punching operation is designated, the trailing ends of the sheets are punched by a puncher 10 in the process wherein the recording sheets P are fed in the horizontal direction with respect to the post processing apparatus B. Then the sheets are ejected into the ejection tray 12.

Figure 4:
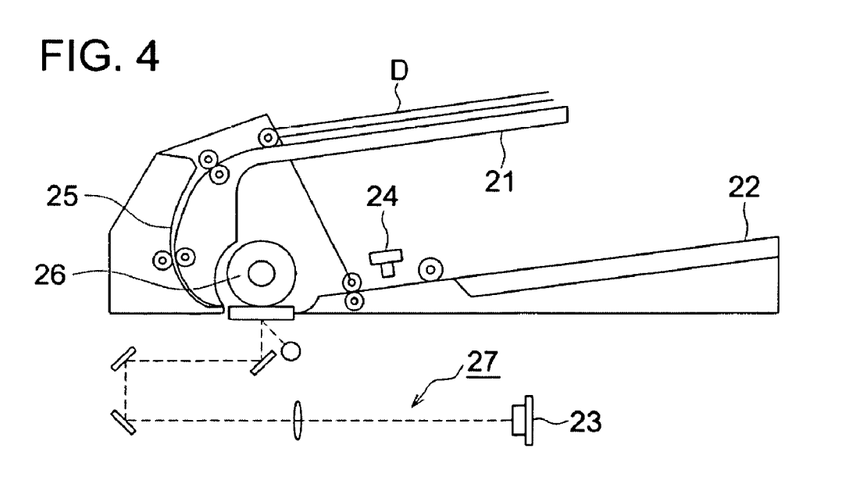
FIG. 4 is a diagram showing the structure of the original reading apparatus.

FIG. 4 is a diagram showing the structure of the original reading apparatus C.

The original reading apparatus C includes an original feed tray 21, an original ejection tray 22, an image pickup device 23 made up of a line CCD, a contact image sensor 24, an original conveyance path 25, an original conveyance roller 26, and a reduction type optical system 27 made up of a plurality of mirrors, original illumination light source and lens.

The contact image sensor 24 includes a line LED for illumination of the originals, a life-size optical system using a GRIN lens, and a line image sensor.

The following describes the operations of the image forming apparatus in the process of copying with reference to FIGS. 1, 2 and 4.

In the copying operation without stapling or punching, original documents D are fed one by one from an original feeding platen 21, and are fed through the original conveyance path 25. Traveling below the original conveyance roller 26, the originals are ejected to the original ejection tray 22. Below the original conveyance roller 25, the front surface image is read by the line image sensor 23. Below the contact sensor 24 as a back surface image reading sensor, the back surface image is read by the contact image sensor 24. In one original conveyance operation, simultaneous duplex reading is carried out, wherein images on both front and back sides are read without the originals being reversed.

In the image forming apparatus A, the toner image of the front surface image is formed on the photoreceptor 5A by electrophotographic process, based on the image data read by the step of original reading.

The toner image of the front surface image is transferred from the photoreceptor 5A onto the front surface of the recording sheets P fed out of the sheet feed tray 4. The recording sheets P having received transfer of the toner image pass through the fixing apparatus 6, whereby the image is fixed.

After the step of fixing, recording sheets P are fed to the sheet re-feed section 7, and are reversed by the sheet re-feed section 7. After that, the sheets are again fed to the image forming section 5 to receive the back surface image transferred from the photoreceptor 5A.

The recording sheets P having received the toner image of the back surface image pass through the fixing apparatus 6, and are fixed. Traveling inside the post processing apparatus B in the horizontal direction, the sheets are ejected into the ejection tray 12.

In the simplex image formation mode, the recording sheets P are fed from the sheet feed tray 4 and a toner image is transferred thereon. These sheets pass through the fixing apparatus 6 to be subjected to the step of fixing. Then the sheets are conveyed inside the post processing apparatus B in the horizontal direction and are ejected into the ejection tray 12.

In the copying operation wherein the step of post processing is designated to perform stapling or punching, image forming and post processing processes are implemented in the following two methods.

<Post Processing 1>

Post processing 1 is applicable to both the simplex copying and duplex copying modes. The simplex copying mode is used as an example in the following description.

Figure 5:
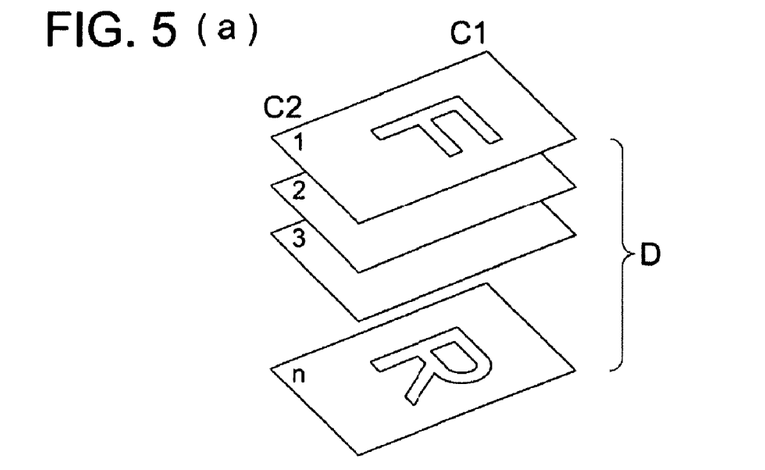
FIGS. 5(a)-5(c) are diagrams showing various aspects of the originals placed on the original feed tray.

As shown in FIG. 5 (a), original documents D with the first page placed at the topmost position (with the image surface facing up) are set face up on the original feed tray 21 and are read. In FIG. 5 (a), the original documents D are set in the upright position. As viewed from where the operator performs operation, the upper portion C1 of the image corresponds to the furthest side, while the lower portion C2 of the image corresponds to the nearest side.

When the original reading operation is performed, the image F is scanned (sub-scanned) in the direction of a1 through a2 in FIG. 2 (b). In this case, the image F is read in the inverted position by the operation of the reduction type optical system 27 in the main scanning direction, namely, in the direction wherein the image pickup device 23 is arranged.

The image data having been read in this manner is rotated and an image is written in the photoreceptor 5A of the image forming section 5.

As a result of image rotation, the image is written by the image F being scanned from b1 through b2, as shown in FIG. 2 (*d*).

As a result, the recording sheets P are fed from the image forming apparatus A to the post processing apparatus B wherein the image carrying surface lies face down and the ends to be subjected to post processing SFB is positioned as the trailing ends.

In the post processing apparatus B, stapling or punching shown in post processing FSB is applied to the trailing end of the recording sheets P and the sheets are ejected to the ejection tray 12.

As described above, the image of the image data is rotated to ensure that the recording sheets P subjected to post processing FSB at a proper position are loaded face down on the ejection tray 12.

<Post Processing 2>

In the original reading apparatus C, original documents D with the first page placed at the lowermost position (with the image surface facing down) are set face down. This original setting is shown in FIG. 5 (*b*). In FIG. 5 (*b*), the original documents D are set in the upright position. As viewed from where the operator performs operation, the upper portion C1 of the image corresponds to the furthest side, while the lower portion C2 of the image corresponds to the nearest side.

The sheets are fed from the original feeding platen 21 one by one from the top. Accordingly, sheet feeding starts from the original document D of the final page.

In the process of feeding the original documents D, the originals are read by the contact image sensor 24.

The reading operation in this case is carried out sequentially by sub-scanning from a2 through a1 in FIG. 2 (*b*). In this case, the contact image sensor 24 uses a GRIN lens, and therefore, the image F is not inverted in the main scanning direction.

The image data obtained by reading is sent to the image forming section 5 in the order of being read, and is written.

As a result, images are written in the order of scanning from b1 through b2 into the photoreceptor 5A, as shown in FIG. 2 (*d*). The recording sheets P placed face down with the position of post processing FSB corresponding to the trailing end are sent from the image forming apparatus A to the post processing apparatus B.

In the post processing apparatus B, stapling or punching is applied to the trailing ends of the recording sheets P and the sheets are ejected to the ejection tray 12.

It should be noted that post processing 2 can be performed by setting the original documents D on the original feed tray 21, as shown in FIG. 5 (*c*).

In FIG. 5 (*c*), the original documents D are inverted (bottom up) and placed face up with the first page corresponding to the topmost page, and are set on the original feeding platen 21.

In FIG. 5 (*c*), the image is inverted (bottom up). The upper portion c1 of the image corresponds to the nearest side, while the lower portion c2 of the image corresponds to the furthest side.

In the copying operation wherein the original documents D are set as shown in FIG. 5 (*c*), the recording sheets P with the image formed thereon are stacked on the stacker 13 of FIG. 1 in the state shown in FIG. 2 (*d*) and are stabled as indicated by the FSB.

It should be noted that post processing 2 is performed only in the simplex copying mode.

<Copying Control in the Post Processing Mode>

Whether copying operation is to be performed using the post processing 1 or 2 is determined by the capacity of the free memory.

To be more specific, if there is a free capacity to perform image rotation, copying operation is performed by post processing 1, whereas copying operation is performed by post processing 2 if there is no such free capacity.

Figure 6:
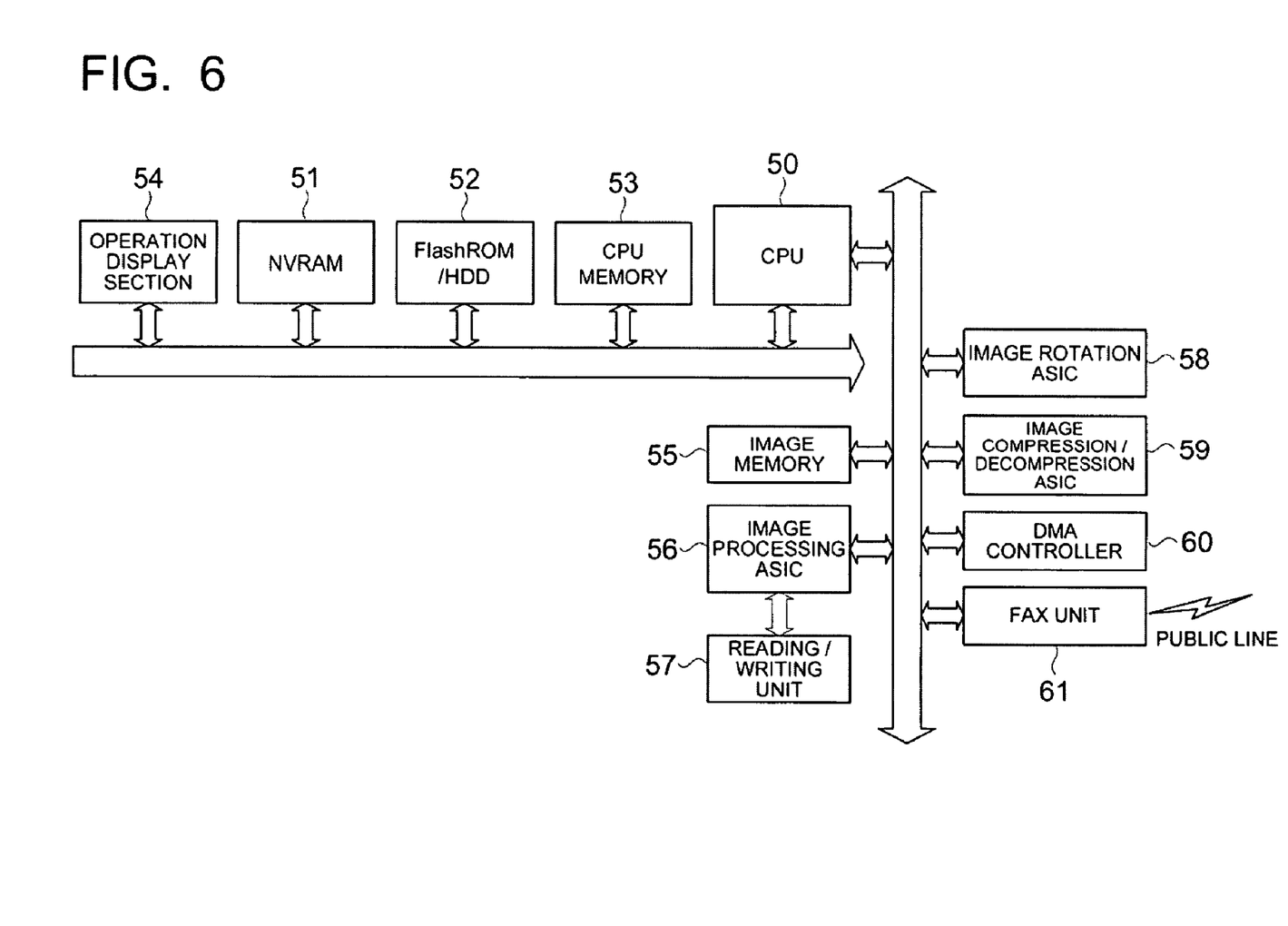
FIG. 6 is a block diagram showing the control system of the copy machine as an embodiment of the present invention.

The aforementioned copying control will be described with reference to FIG. 6 and FIG. 7. FIG. 6 is a block diagram showing the control system of the copy machine as an embodiment of the present invention, and FIG. 7 is a control flow chart.

In FIG. 6, the reference numeral 50 denotes the CPU for overall control, 51 indicates the nonvolatile RAM, and 52 represents a memory made up of a ROM and HDD for storing data and programs. The reference numeral 53 is a CPU work memory, 54 is an operation display section as a user interface for receiving various forms of condition settings in the copying operation and displaying various forms of statuses, 55 is an image memory, 56 is an image processing ASIC for performing image processing such as image editing and scaling, 57 is a reading/writing unit for reading and writing images, 58 is an image rotation ASIC for performing image rotation, 58 is an image compression/decompression ASIC, 60 is a DMA controller, and 61 is a FAX unit.

Figure 7:
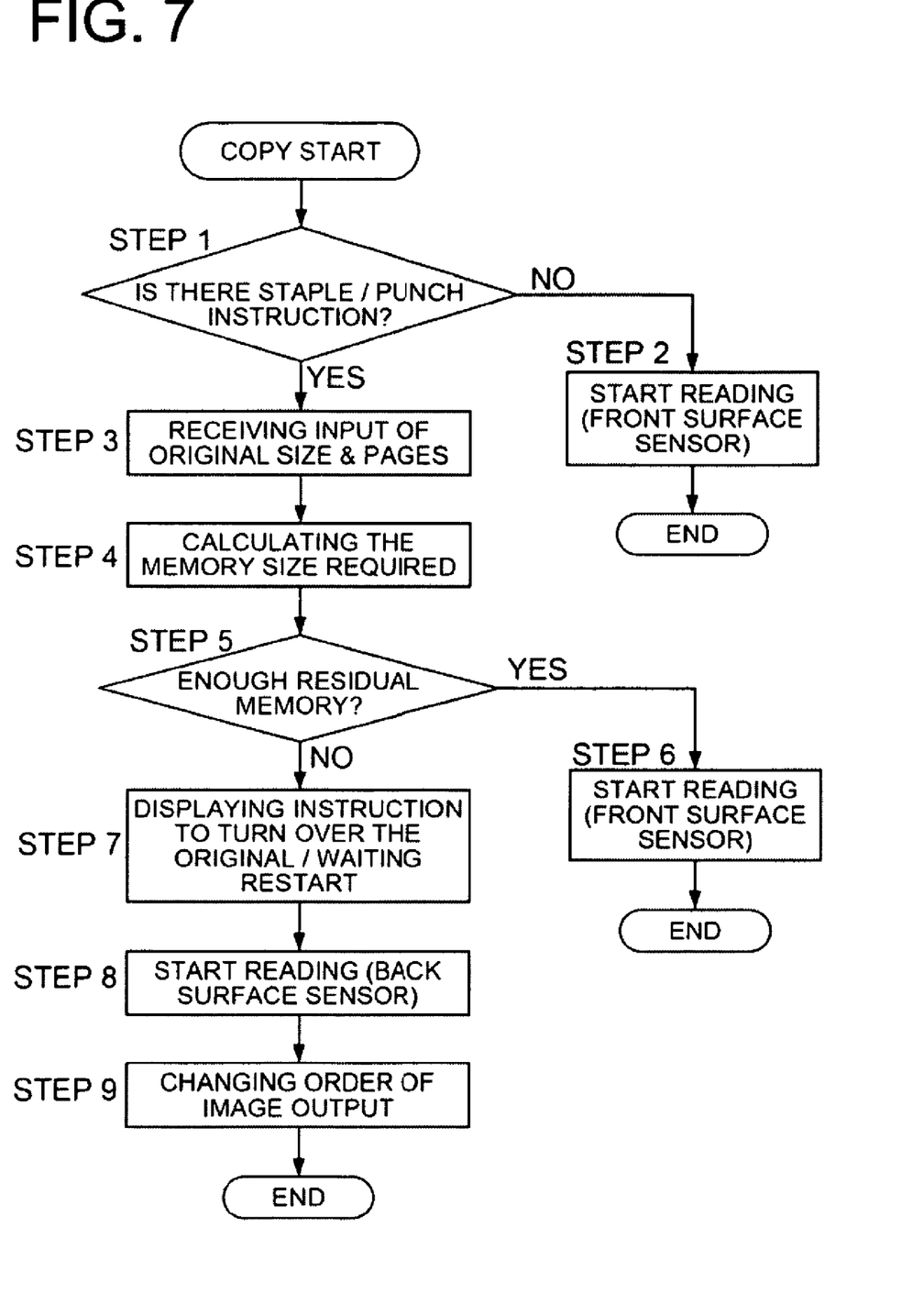
FIG. 7 is a diagram showing an example of the control flow chart.

FIG. 7 is a diagram showing an example of the control in the simplex copying mode In Step 1 of FIG. 7, a decision is made to see whether or not there is a stapling or punching instruction.

If there is no stapling or punching instruction (NO) in Step 1, originals are read in Step 2. They are read by using the line image sensor 23 of FIG. 4.

If there is a stapling or punching instruction (YES) in Step 1, inputting of the original size and the number of originals is received in Step 3.

In Step 4, the memory capacity required for image rotation is calculated. The memory capacity required for image rotation differs with the original size and the number of the originals. The information on original size and the number of originals received in Step 3 is used in this case.

In Step 5, comparison is made between the free capacity of the image memory 55 and memory capacity calculated in Step 4, and a decision is made to see whether the residual memory capacity is sufficient or not.

If the residual memory capacity is sufficient, originals are read by the line image sensor 23 that reads the front surface image, in Step 6.

If the residual memory capacity is insufficient, a display is given in Step 7 to instruct that the original documents D should be re-set face down on the original feeding platen 21, as shown in FIG. 5 (*b*). This display is given by the message "Set the originals face down" which appears on the operation display section 54.

In response to this message, the operator re-sets the originals, and presses the original reading Start button upon completion of re-setting operation. The system waits for the operation of this Start button in Step 7.

When the Start button has been pressed, original reading starts in Step 8, using the contact sensor 24.

In Step 9, the order of image outputting is changed.

Since the originals are placed face down, originals are read from the last page. Thus, when the image is outputted, the order is reversed, image outputting is started from the first page, and the image is formed on the recording sheet.

In Step 7, a message can be displayed to re-set the original documents D face up, as shown in FIG. 5 (*c*) so that the image is inversed.

When copying operation is performed with the original documents D placed as shown in FIG. 5 (*c*), the order of image outputting in Step 10 is not changed.

Figure 8:
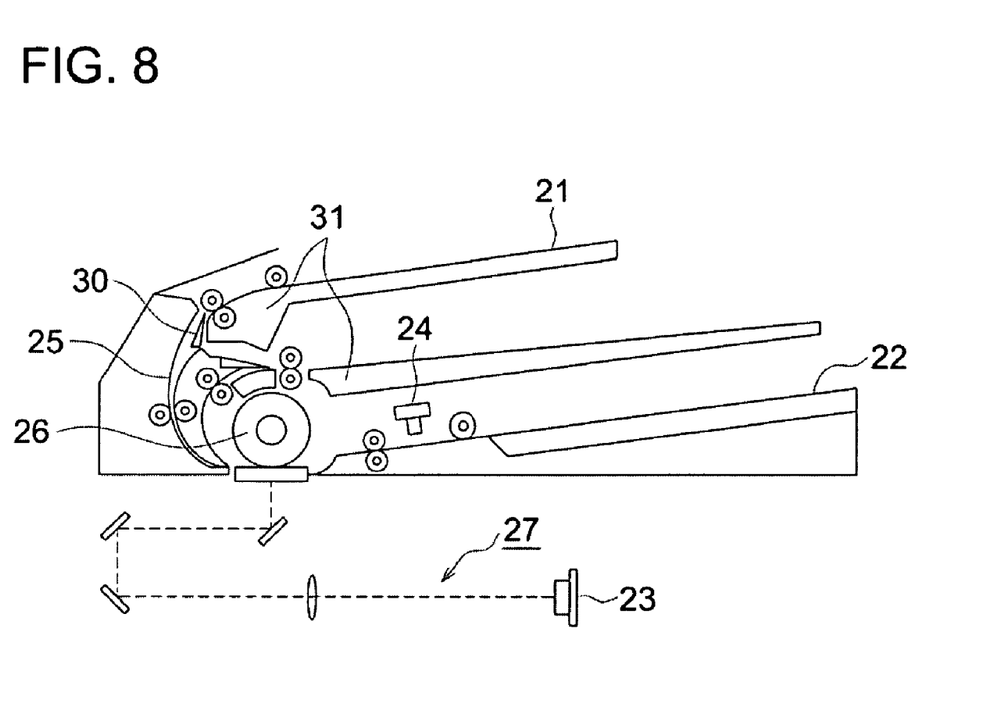
FIG. 8 is a diagram showing another example of the original reading apparatus used in the embodiment of the present invention.

FIG. 8 shows another example of the original reading apparatus used in the embodiment of the present invention.

In this example, a switching gate 30 and a reversing conveyance path 31 are added to the original reading apparatus of FIG. 4. This arrangement eliminates the need of re-setting the originals. If the memory capacity is insufficient, an image is formed automatically adjusted within the copy machine so that the direction of the image carried on the recording sheets P fed to the post processing apparatus B conforms to stapling or punching. This arrangement enhances the operability of the copy machine.

In the copying job without the step of post processing, namely, neither stapling nor punching, simplex and duplex copying operations are performed as described above.

In the copying job including the step of post processing 1, copying operations are also performed as described above.

The original reading operation in post processing 2 is performed in the procedure specific to this example. This will be described below.

In the copying operation accompanied by post processing 2, the original documents D are placed face up on the original feed tray 21.

In the step of original reading, the original documents D are fed out sequentially starting from the top. The original documents D are guided by the switching gate 30 and are fed to the reversing conveyance path 31.

After being switched back on the reversing conveyance path 31, the originals are fed along the conveyance path 25, and are ejected to the ejection tray 22. In this step of conveyance, the images of the original documents D are read by the contact image sensor 24.

Reading by scanning is performed in the order from a2 through a1 of FIG. 2 (*b*).

The recording sheets P wherein an image is written based on the image data obtained by reading and is formed by the image forming apparatus A are placed face down. With the image carrying surface facing down, the recording sheets P are fed from the image forming apparatus A to the post processing apparatus B. Passing through the post processing apparatus B in the state of FIG. 2 (*d*), the recording sheets P are stacked on the stacker 13.

Thus, the position indicated by FSB in FIG. 2 (*d*) are punched or stapled. After proper post processing, the sheets are ejected face down onto the ejection tray 12.

Figure 9:
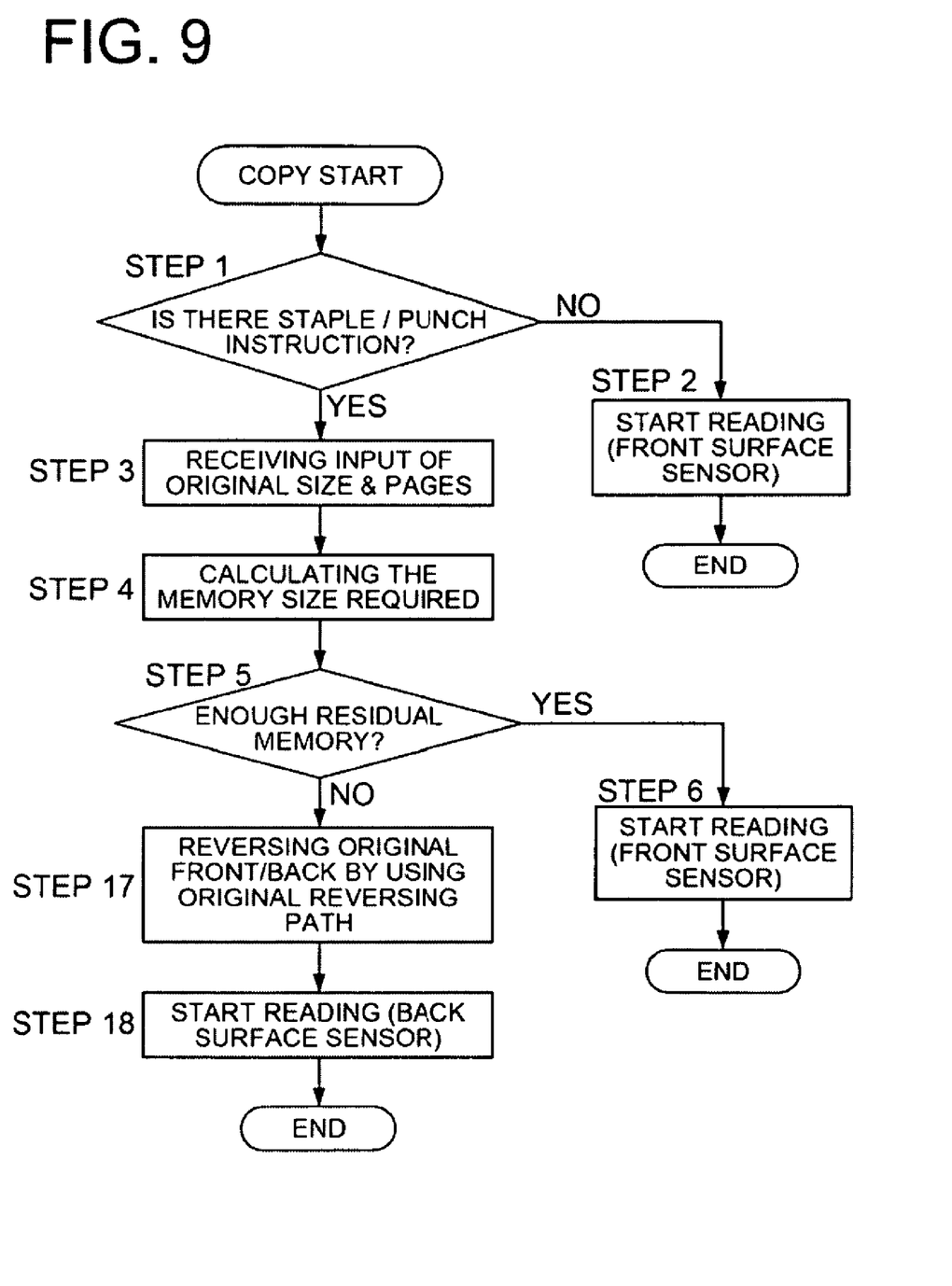
FIG. 9 is a flow chart showing the copying control in the post processing mode of the copy machine provided with an original reading apparatus B of FIG. 8.

FIG. 9 is a flow chart showing the copying control in the post processing mode of the copy machine provided with an original reading apparatus B of FIG. 8.

Step 1 through Step 6 are the same as those of FIG. 7.

If the decision in Step 5 is negative (NO), the switching gate 30 of FIG. 8 is driven in Step 17 to form a conveyance path that leads the original documents D through the reversing conveyance path 31. Then original reading starts.

In Step 18, the image is read by the contact image sensor 24, whereby image data is generated.

An image is formed based on the image data having been obtained, and post processing operation is performed. Thus, the sheets properly finished as shown in FIG. 2 (*d*) are printed out.

The present invention allows stapling or punching operation to be performed even if the capacity required for image rotation is not available in the image memory. This arrangement eliminates the inconvenience of having to suspend the copying operation accompanied by post processing operation, or having to perform copying operation without post processing, due to insufficient image memory.

Further, the aforementioned improvement can be achieved without having to increase the memory capacity, hence, without having to increase the cost.

What is claimed is:

1. A copy machine comprising:
an original reading apparatus which comprises a front surface image reading sensor and back surface image reading sensor, the original reading apparatus being capable of setting plural original documents, feeding out the original documents one by one, and simultaneously reading both surfaces of each of the original documents;
an image forming apparatus for forming an image on a recording sheet based on image data obtained by the original reading apparatus;
a post processing apparatus for executing post processing of at least one of stapling and punching onto the recording sheet on which the image is formed;
a display section;
a control section;
an image processing section which rotates an image by 180 degrees with respect to the image data;
an image memory;
wherein, in a copying operation with the post processing being designated, the control section controls in such a way that:
in cases where the memory capacity required for image rotation is available in the image memory, the original documents are read to obtain image data by the front surface image reading sensor; the obtained image data is subjected to the image rotation by the image processing section; and an image is formed on the recording sheet by the image forming apparatus based on image data having been subjected to the image rotation; whereas,
in cases where the memory capacity required for the image rotation is not available in the image memory, an indication to re-set the original documents is displayed on the display section; the original documents having been re-set are fed out to be read by the back surface image reading sensor; an image is formed on the recording sheet by the image forming apparatus based on image data obtained by the back surface image reading sensor; and
the post processing is executed onto the image-formed recording sheet, by the post processing apparatus.

2. The copy machine of claim 1, wherein the display section displays, as the indication to re-set the original documents, prompting indication to change a face-up set into a face-down set of the original documents.

3. The copy machine of claim 1, wherein the display section displays, as the indication to re-set the original, prompting indication to change a face-up set with upright original images into a face-up set with inversed original images of the original documents.

4. The copy machine of claim 1, wherein the image forming apparatus forms the image on the recording sheet in a face-down state, and ejects the recording sheet in the face-down state.

5. The copy machine of claim 2, further comprising a page editing section which reverses a page order with respect to the image data obtained by the back surface image reading sensor.

6. A copy machine comprising:

an original reading apparatus which comprises a front surface image reading sensor, back surface image reading sensor, and a reversing conveyance section to reverse and convey original documents, the original reading apparatus being capable of setting plural original documents, feeding out the original documents one by one, and simultaneously reading both surfaces of each of the original documents;

an image forming apparatus for forming an image on a recording sheet based on image data obtained by the original reading apparatus;

a post processing apparatus for executing post processing of at least one of stapling and punching onto the recording sheet on which the image is formed;

a display section;

a control section;

an image processing section which rotates an image by 180 degrees with respect to the image data;

an image memory;

wherein, in a copying operation with the post processing being designated, the control section controls in such a way that:

in cases where the memory capacity required for image rotation is available in the image memory, the original documents are read to obtain image data by the front surface image reading sensor; the obtained image data is subjected to the image rotation by the image processing section; and an image is formed on the recording sheet by the image forming apparatus based on image data having been subjected to the image rotation; whereas, in cases where the memory capacity required for the image rotation is not available in the image memory, the original documents set in a face-up state are fed one by one, and reversed by the reversing conveyance section; the reversed original documents are read by the back surface image reading sensor; and an image is formed on the recording sheet by the image forming apparatus based on image data obtained by the back surface image reading sensor; and the post processing is executed onto the image-formed recording sheet, by the post processing apparatus.

* * * * *